(12) United States Patent
Darabi

(10) Patent No.: US 7,904,047 B2
(45) Date of Patent: Mar. 8, 2011

(54) RADIO FREQUENCY FILTERING TECHNIQUE WITH AUTO CALIBRATED STOP-BAND REJECTION

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 709 days.

(21) Appl. No.: 11/931,438

(22) Filed: Oct. 31, 2007

(65) Prior Publication Data

US 2009/0111418 A1   Apr. 30, 2009

(51) Int. Cl.
*H04B 1/10* (2006.01)
(52) U.S. Cl. .................. 455/304; 455/306; 455/307
(58) Field of Classification Search .............. 455/278.1, 455/283–287, 296, 304–307, 303
See application file for complete search history.

(56) References Cited

U.S. PATENT DOCUMENTS

| | | | | |
|---|---|---|---|---|
| 4,191,926 A | * | 3/1980 | Pontano et al. | 455/304 |
| 4,718,113 A | * | 1/1988 | Rother et al. | 455/209 |
| 4,908,581 A | * | 3/1990 | Honjo | 329/320 |
| 5,778,310 A | * | 7/1998 | Tong et al. | 455/306 |
| 5,995,565 A | * | 11/1999 | Tong et al. | 375/346 |
| 7,139,543 B2 | * | 11/2006 | Shah | 455/296 |
| 7,295,816 B2 | * | 11/2007 | McCallister | 455/114.2 |
| 7,551,910 B2 | * | 6/2009 | Darabi | 455/296 |
| 7,664,455 B2 | * | 2/2010 | So et al. | 455/3.01 |
| 2003/0148748 A1 | * | 8/2003 | Shah | 455/296 |
| 2006/0009185 A1 | * | 1/2006 | Shamsaifar et al. | 455/278.1 |
| 2006/0035620 A1 | * | 2/2006 | Millard et al. | 455/339 |
| 2007/0264943 A1 | * | 11/2007 | Darabi | 455/88 |
| 2008/0242245 A1 | * | 10/2008 | Aparin | 455/126 |

* cited by examiner

*Primary Examiner* — Edward Urban
*Assistant Examiner* — RuiMeng Hu
(74) *Attorney, Agent, or Firm* — Fiala & Weaver P.L.L.C.

(57) ABSTRACT

Methods, systems, and apparatuses for filtering received radio frequency signals are provided. A first RF communication signal is received that includes a desired information signal portion and an undesired blocker signal portion that is offset in frequency from the desired portion. The first RF communication signal is amplified in a first signal path and is filtered in a second signal path. The filtering of the first RF communication signal in the second signal path includes: down-converting the first RF communication signal to a down-converted signal, high pass filtering the down-converted signal, and up-converting the high pass filtered down-converted signal to a second RF communication signal. The filtering of the first RF communication signal filters out the desired information signal portion from the second signal path. A signal phase is adjusted in the second signal path to match phase shifts between the first and second signal paths. The second RF communication signal is subtracted from the amplified first RF communication signal to generate a third RF communication signal. Third RF communication signal includes the desired information signal portion but does not include the blocker signal, which is canceled during the subtraction.

16 Claims, 13 Drawing Sheets

600

602
amplify a first RF communication signal in a first signal path 604
filter the first RF communication signal in a second signal path to generate a second RF communication signal 606
subtract the second RF communication signal from the amplified first RF communication signal to generate a third RF communication signal

604

802

1102
down-convert the first RF communication signal to an I-phase down-converted signal 1104
down-convert the first RF communication signal to a Q-phase down-converted signal

804

1106
high pass filter the I-phase down-converted signal 1108
high pass filter the Q-phase down-converted signal

806

1110
up-convert the high pass filtered I-phase down-converted signal to an I-phase RF communication signal 1112
up-convert the high pass filtered Q-phase down-converted signal to a Q-phase RF communication signal 1114
combine the I-phase RF communication signal and the Q-phase RF communication signal to generate the second RF communication signal

FIG. 11

1202 adjust a signal phase in the second signal path such that the second RF communication signal is phase adjusted

RADIO FREQUENCY FILTERING TECHNIQUE WITH AUTO CALIBRATED STOP-BAND REJECTION

BACKGROUND OF THE INVENTION

1. Field of the Invention

The present invention relates to communication systems, and in particular, to the filtering of radio frequency communication signals.

2. Background Art

Wireless communication systems enable the transfer of information over a distance without the use of electrical conductors or wires. Such wireless communication systems typically transmit radio frequency (RF) communication signals that are modulated with information. Varieties of communication standards exist that define attributes of communication signals for use in different applications. For example, a communication signal according to a particular standard may have a defined carrier frequency, one or more defined modulation schemes, a defined error correction scheme, and/or further defined attributes.

A wireless communication system may include one or more transmitters and receivers. A transmitter is used to transmit a RF communication signal, while a receiver is used to receive the transmitted RF communication signal. A transmitted communication signal has a bandwidth, which is a difference between upper and lower cutoff frequencies for the signal. For example, FIG. 1 shows a graph 100 of frequency versus amplitude for a RF communication signal 102. RF communication signal 102 is illustrated in FIG. 1 as having a center (e.g., carrier) frequency of $f_1$ and a bandwidth BW. A signal near RF communication signal 102 in frequency may be received by a receiver attempting to receive communication signal, and thus may interfere with RF communication signal 102. Such a signal may be referred to as a "blocker signal." For example, FIG. 1 shows a blocker signal 104, having a frequency of $f_2$ that is near frequency $f_1$ of RF communication signal 102.

FIG. 2 shows a conventional receiver 200 that may be used to receive RF communication signal 102. As shown in FIG. 2, receiver 200 includes an antenna 202, a SAW (surface acoustic wave) filter 204, an LNA (low noise amplifier) 206, and a down-converter 208. As shown in FIG. 2, antenna 202 receives RF communication signal 102, which is desired, but may also undesirably receive blocker signal 104 with RF communication signal 102. SAW filter 204 is coupled to antenna 202, and receives RF communication signal 102 and blocker signal 104 from antenna 202. SAW filter 204 has a pass band configured to pass RF communication signal 102 and a stop band configured to filter out blocker signal 104. SAW filter 204 generates a filtered communication signal 212, which is received by LNA 206. LNA 206 amplifies filtered communication signal 212, generating an amplified filtered communication signal 214. Down-converter 208 receives amplified filtered communication signal 214, and generates a down-converted output signal 216, which is typically a baseband information signal.

In many receivers, such as receiver 200, a stringent blocking requirement must be met. For instance, in the GSM (Global System for Mobile communications) standard, RF communication signal 102 may be received at 3 dB above a sensitivity level, and may be accompanied by a 0 dBm blocker signal 104 that may be as close as 80 MHz to the edge of the PCS (Personal Communications Service) band of signal 102. In this case, because the desired signal is relatively weak, the gain of LNA 206 must be relatively high, and thus blocker signal 104 must be well filtered by SAW 204. Due to the modest Q of on-chip inductors, it is not practical to integrate a SAW filter 204 having such filter sharpness in the same integrated circuit chip as LNA 206 and/or the rest of receiver 200. For these reasons, SAW filter 204 is external to the integrated circuit chip from LNA 206.

Disadvantages are caused by having SAW filter 204 off chip from other portions of receiver 200. First, cost is increased due to an increase in a number of components, especially in multi-mode, multi-band applications. Second, the insertion loss of SAW filter 204, which is typically as high as 2-3 dB, degrades the sensitivity of receiver 200. Third, there is less flexibility in sharing LNA 206 in multi-band applications, and particularly in software-defined radios.

Thus, what is desired are ways of filtering RF communications signals in a manner that reduces costs, avoids problems with insertion loss, and provides flexibility in multi-band applications, as an alternative to the use of SAW filters.

BRIEF SUMMARY OF THE INVENTION

Methods, systems, and apparatuses for filtering received radio frequency signals are provided. A first RF communication signal is received that includes a desired information signal portion and an undesired blocker signal portion that is offset in frequency from the desired portion. The first RF communication signal is amplified in a first signal path and is filtered in a second signal path. The filtering of the first RF communication signal in the second signal path removes the desired information signal portion from the second signal path. A signal phase is adjusted to match phase shifts between the first and second signal paths. The second RF communication signal is subtracted from the amplified first RF communication signal to generate a third RF communication signal. Third RF communication signal includes the desired information signal portion but does not substantially include the blocker signal, which was canceled during the subtraction operation.

In a further aspect, the filtering of the first RF communication signal in the second signal path includes: down-converting the first RF communication signal to a down-converted signal, high pass filtering the down-converted signal, and up-converting the high pass filtered down-converted signal to a second RF communication signal. The high pass filtering of the down-converted signal passes the undesired blocker signal, while removing the desired information signal.

The adjustment of the signal phase to match the signal path phases may occur anywhere in the second signal path. In examples, the phase of the down-converted signal, the phase of the high pass filtered down-converted signal, and/or the phase of the second RF communication signal may be adjusted. The phase adjustment may include determining a power level of the blocker signal remaining in the generated third RF communication signal, and adjusting the signal phase in the second signal path according to the determined power level. The phase adjustment may alternatively include adjusting the signal phase in the second signal path according to a predetermined delay of at least one component in the second signal path.

In an aspect, the information signal portion of the received first RF communication signal may include information modulated on a carrier frequency according to an I/Q modulation scheme. In such an aspect, filtering of the first RF communication signal may be performed by separately filtering I and Q portions of the signal, and combining the separately filtered portions. Phase adjustment of the I and Q portions may be performed separately, or may be performed together after being combined.

In an example aspect, the first RF communication signal may be down-converted to an I-phase down-converted signal and to a Q-phase down-converted signal. The I-phase down-converted signal and the Q-phase down-converted signal may each be high pass filtered. The high pass filtered I-phase down-converted signal may be up-converted to an I-phase RF communication signal, and the high pass filtered Q-phase down-converted signal may be up-converted to a Q-phase RF communication signal. The filtered I-phase and Q-phase RF communication signals may be combined to generate the second RF communication signal, which may subtracted from the amplified first RF communication signal as described above.

In another example aspect, filtering and phase adjustment of the first RF communication signal may be performed as follows. The first RF communication signal may be down-converted to a first I-phase down-converted signal, a first Q-phase down-converted signal, a second I-phase down-converted signal, and a second Q-phase down-converted signal. Each of the first I-phase down-converted signal, first Q-phase down-converted signal, second I-phase down-converted signal, and second Q-phase down-converted signal may be high pass filtered. The high pass filtered first I-phase down-converted signal may be scaled according to a first scale factor. The high pass filtered first Q-phase down-converted signal may be scaled according to a second scale factor. The scaled high pass filtered first I-phase down-converted signal and the scaled high pass filtered first Q-phase down-converted signal may be combined to generate a first combined signal. The high pass filtered second I-phase down-converted signal may be scaled according to an inverted version of the second scale factor. The high pass filtered second Q-phase down-converted signal may be scaled according to the first scale factor.

The scaled high pass filtered second I-phase down-converted signal and the scaled high pass filtered second Q-phase down-converted signal may be combined to generate a second combined signal. The first combined signal may be up-converted to an I-phase RF communication signal, and the second combined signal may be up-converted to a Q-phase RF communication signal. The I-phase RF communication signal and the Q-phase RF communication signal may be combined to generate the second RF communication signal, which may subtracted from the amplified first RF communication signal as described above.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 11 shows a flowchart providing example steps for operation of the receiver translational circuit of FIG. 10, according to an embodiment of the present invention.

Figure 1:
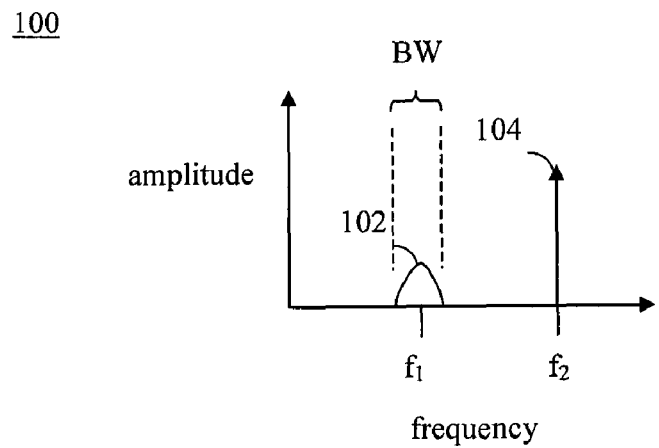
FIG. 1 shows a graph of frequency versus amplitude for a communication signal and blocker signal.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Embodiments

In embodiments, improved ways of filtering RF signals is provided. For example, embodiments may be implemented in receivers, transmitters, transceivers, and/or other portions of a communications system. Embodiments of the present invention can be incorporated into any type of communication system, including cellular networks, wireless local area networks (WLANs), wirelessly broadcast digital television systems, wirelessly broadcast digital radio systems, and other types of communication systems. For instance, embodiments can be implemented in stationary communication devices and handheld communication devices, such as mobile phones (e.g., cell phones), handheld computing devices (e.g., personal digital assistants (PDAs), Blackberry™ devices, Palm Pilots™, etc.), laptop computers, portable music players, mobile television devices, etc.

The example embodiments described herein are provided for illustrative purposes, and are not limiting. The examples described herein may be adapted to various types of mobile communications systems, including cellular networks, wireless local area network(s), digital radio systems, etc. Furthermore, additional structural and operational embodiments, including modifications/alterations, will become apparent to persons skilled in the relevant art(s) from the teachings herein.

Figure 3:
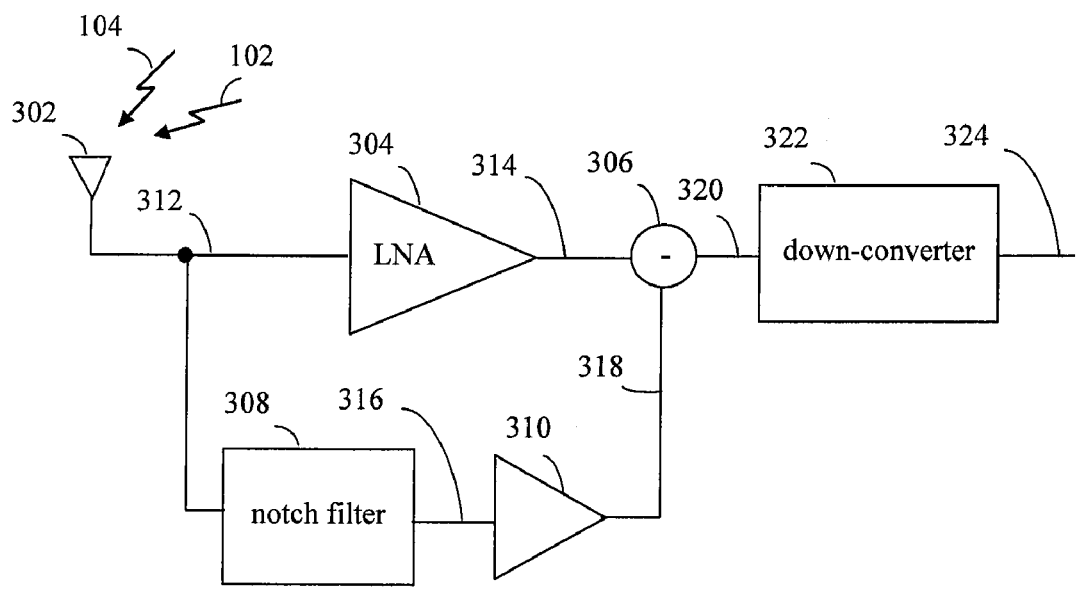
FIG. 3 shows another receiver that may be used to receive the communication signal represented in FIG. 1.

FIG. 3 shows a receiver 300 that may be used to receive communication signals. Receiver 300 is configured to receive RF communication signal 102, while reducing an adverse effect of blocker signal 104. As described above with respect to FIG. 1, RF communication signal 102 has a center (e.g., carrier) frequency $f_1$, and has a bandwidth BW. Frequency $f_1$ may be any radio frequency, including a frequency in the mega-Hertz and giga-Hertz ranges. Blocker signal 104 is an undesired signal that may interfere with the receiving of RF communication signal 102. Blocker signal 104 has a frequency $f_2$ that is relatively near frequency $f_1$ of RF communication signal 102.

As shown in FIG. 3, receiver 300 includes an antenna 302, a LNA (low noise amplifier) 304, a subtractor 306, a notch filter 308, a second amplifier 310, and a down-converter 322. Antenna 302 receives RF communication signal 102 and blocker signal 104. LNA 304 receives an RF signal 312 from antenna 302, which includes RF communication signal 102 and blocker signal 104. LNA 304 amplifies RF signal 312, generating amplified RF signal 314.

Figure 4:
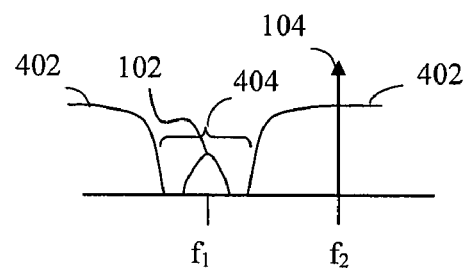
FIG. 4 shows a frequency response of a notch filter of the receiver of FIG. 3.

Notch filter 308 receives RF signal 312 from antenna 302. FIG. 4 shows a frequency response 400 of notch filter 308. As shown in FIG. 4, notch filter 308 has a pass band 402 configured to pass blocker signal 104, and a stop band 404 centered around frequency $f_1$ configured to filter out RF communication signal 102. Stop band 404 is typically at least as wide as bandwidth BW of RF communication signal 102. Notch filter 308 of FIG. 3 generates a filtered communication signal 316. Filtered communication signal 316 includes blocker signal 104, but does not substantially include RF communication signal 102 because of the filtering operation of notch filter 308. Second amplifier 310 is optionally present, and when present amplifies filtered communication signal 316 to generate an amplified filtered communication signal 318.

Subtractor 306 receives amplified RF signal 314 and amplified filtered communication signal 318. Subtractor 306 subtracts amplified filtered communication signal 318 from amplified RF signal 314 to generate a filtered output communication signal 320. Because both amplified filtered communication signal 318 and amplified RF signal 314 include blocker signal 104, blocker signal 104 is subtracted out by subtractor 306. Because communication signal 318 is only substantially present in amplified RF signal 314, communication signal 318 is not canceled, and thus is present in output communication signal 320. Note that communication signal 318 may be present in output communication signal 320 in an amplified and/or otherwise modified form due at least to operation of LNA 304, as would be known to persons skilled in the relevant art(s).

Down-converter 322 receives output communication signal 320, and generates a down-converted output signal 324. Down-converted output signal 324 may be an intermediate or baseband frequency signal including information that may be processed by subsequent hardware, software, and/or firmware, as would be desired for a particular application.

Figures 5, 6:
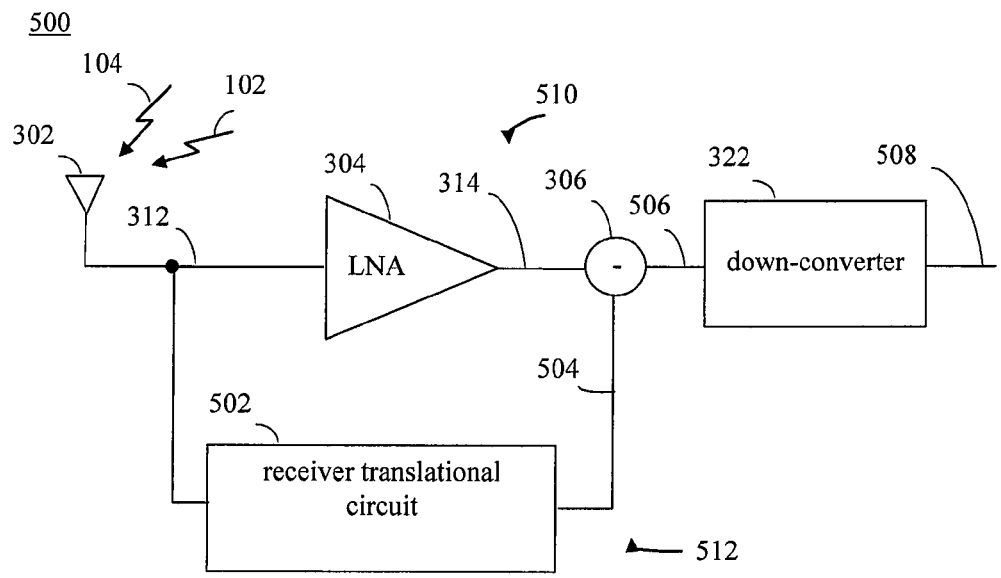
FIG. 5 shows a receiver that includes a receiver translational circuit, according to an example embodiment of the present invention.
FIG. 6 shows a flowchart providing example steps for filtering a communication signal, according to an embodiment of the present invention.

The implementation of FIG. 3 has disadvantages. For example, similarly to SAW filter 204 described above with respect to FIG. 2, notch filter 308 cannot be implemented on an integrated circuit chip with other components of receiver 300, such as LNA 304. FIG. 5 shows a block diagram of a receiver 500 that overcomes this disadvantage of receiver 300, according to an example embodiment of the present invention. Receiver 500 is similar to receiver 300 shown in FIG. 3, with differences described as follows. As shown in FIG. 5, receiver 500 includes LNA 304 in a first signal path 510 and a receiver translational circuit 502 in a second signal path 512 that is parallel to first signal path 510. Receiver translational circuit 502 performs a filtering operation on RF signal 312 similar to notch filter 308, such that RF communication signal 102 is substantially filtered out, while substantially passing blocker signal 104. In an embodiment, receiver translational circuit 502 performs the filtering operation by down-converting, filtering, and up-converting RF communication signal 312.

As shown in FIG. 5, receiver translational circuit 502 receives RF signal 312 and generates a filtered RF communication signal 504, which includes blocker signal 104. Subtractor 306 receives amplified RF signal 314 and filtered RF communication signal 504. Subtractor 306 subtracts filtered RF communication signal 504 from amplified RF signal 314 to generate a filtered output communication signal 506. Because both filtered RF communication signal 504 and amplified RF signal 314 include blocker signal 104, blocker signal 104 is subtracted out by subtractor 306. Because RF communication signal 102 is only substantially present in amplified RF signal 314, RF communication signal 102 is present in output communication signal 506. RF communication signal 104 may be present in output communication signal 506 in an amplified and/or otherwise modified form due at least to operation of LNA 304, imperfect filtering by circuit 502, and/or due to other factors, as would be known to persons skilled in the relevant art(s).

Down-converter 208 receives output communication signal 506, and generates a down-converted output signal 508. Down-converted output signal 508 may be an intermediate or baseband frequency signal including information that may be further processed by subsequent hardware, software, and/or firmware, as would be desired for a particular application.

FIG. 6 shows a flowchart 600 providing example steps for filtering a communication signal, according to an embodiment of the present invention. For instance, receiver 500 shown in FIG. 5 may operate according to flowchart 600, in an embodiment. Other structural and operational embodiments will be apparent to persons skilled in the relevant art(s) based on the discussion regarding flowchart 600. Flowchart 600 is described as follows.

Flowchart 600 begins with step 602. In step 602, a first RF communication signal is amplified in a first signal path. For example, LNA 304 shown in FIG. 5 may perform step 602. LNA 304 receives and amplifies RF signal 312, generating amplified RF signal 314.

In step 604, the first RF communication signal is filtered in a second signal path to generate a second RF communication signal. For example, receiver translational circuit 502 shown in FIG. 5 may perform step 604. Receiver translational circuit 502 receives and filters RF signal 312, generating filtered RF communication signal 504, which includes blocker signal 104. However, RF communication signal 102 is substantially not present in signal 504 due to the filtering operation.

In step 606, the second RF communication signal is subtracted from the amplified first RF communication signal to generate a third RF communication signal. For example, subtractor 306 shown in FIG. 5 may perform step 606. Subtractor 306 receives amplified RF signal 314 and filtered RF communication signal 504. Subtractor 306 subtracts filtered RF communication signal 504 from amplified RF signal 314 to generate a third RF communication signal, output communication signal 506. As described above, blocker signal 104 is substantially canceled by subtractor 306, so that output communication signal 506 includes RF communication signal 102 but does not substantially include blocker signal 104.

Figure 2:
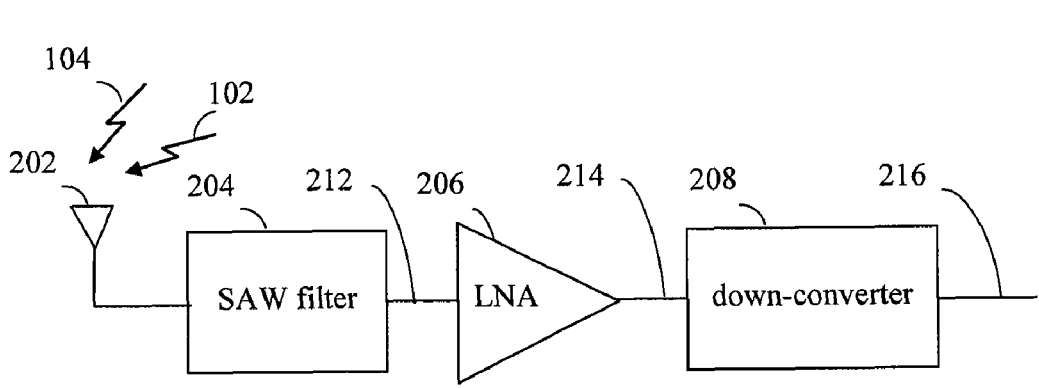
FIG. 2 shows a conventional receiver that may be used to receive the communication signal represented in FIG. 1.

Receiver 500 has advantages over receiver 300 of FIG. 3 and receiver 200 of FIG. 2. For example, SAW filter 204 and notch filter 308, are formed of components that are external to an integrated circuit chip including other portions of their respective receivers. Receiver translational circuit 502 may be included in an integrated circuit chip that includes LNA 304 and further components of receiver 500. Thus, less board space may be required for receiver 500. Furthermore, receiver 500 may be lower cost at least due to a lower parts count. Furthermore, receiver 500 may be more flexibly configured, because the filtering performed by receiver translational circuit 502 may be adjusted if needed.

Antenna 302 may be any type of antenna suitable for receiving RF communication signals, include a dipole antenna, a dual dipole antenna, a loop antenna, a patch antenna, or other type of antenna, as would be known to persons skilled in the relevant art(s). LNA 304 may be any type of low noise amplifier, as would be known to persons skilled in the relevant art(s). Subtractor 306 may be a circuit node or other circuit configuration that subtracts received signals. Example circuits for subtractor 306 include a configuration of resistors and/or other circuit elements, an amplifier arranged in a subtracting configuration, and/or other circuit, as would be known to persons skilled in the relevant art(s).

Figure 7:
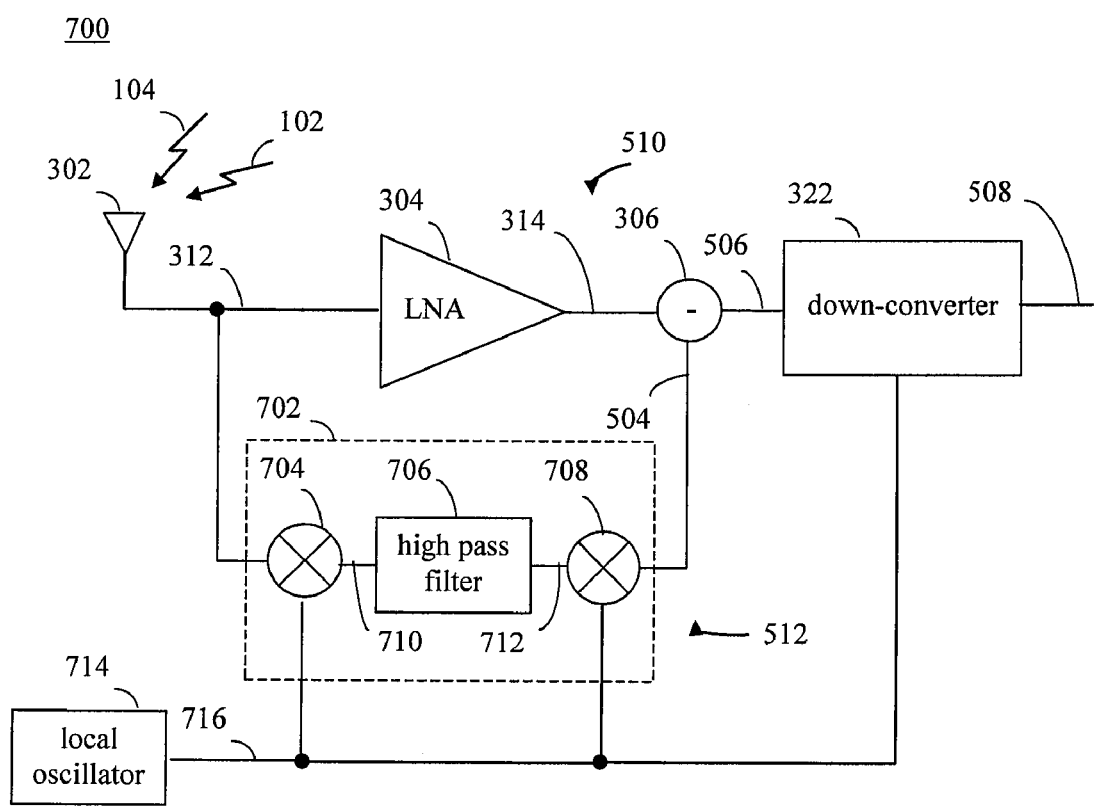
FIG. 7 shows a receiver that includes an example receiver translational circuit, according to an embodiment of the present invention.
Figure 8:
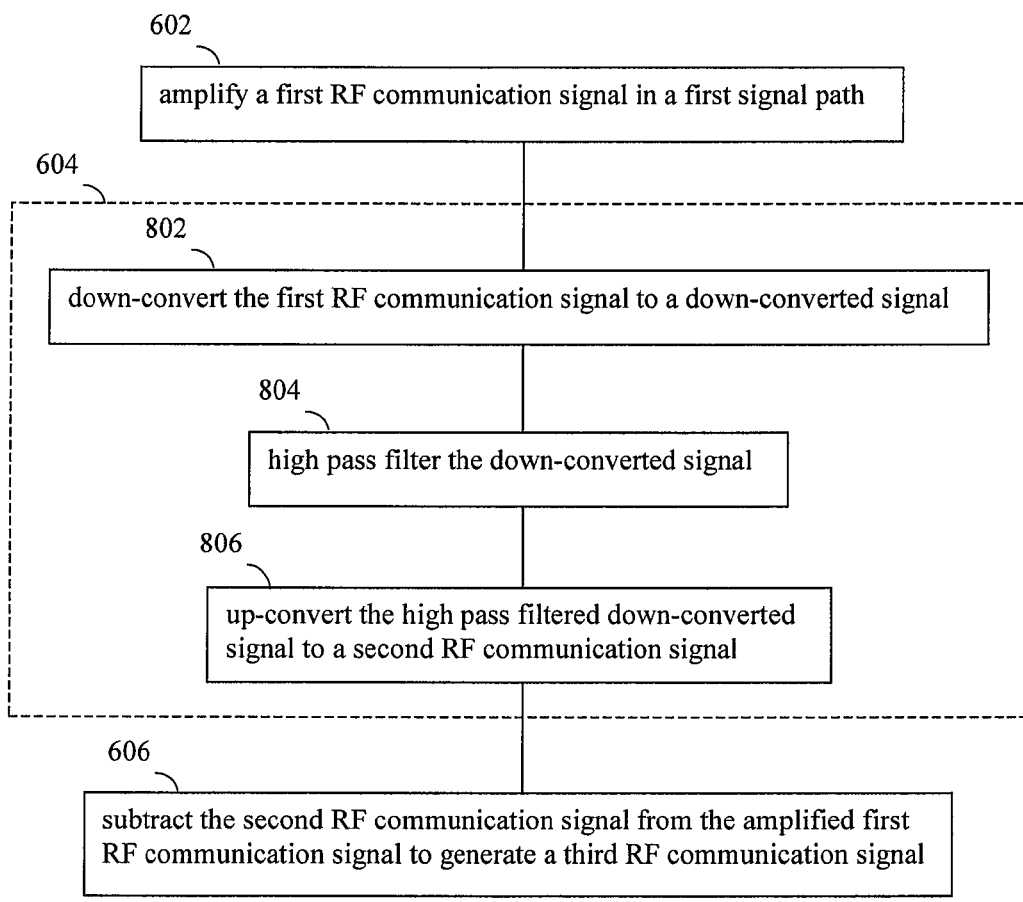
FIG. 8 shows a flowchart providing example steps for operation of the receiver of FIG. 7, according to an embodiment of the present invention.

Receiver translational circuit 502 may be configured in any manner to perform its function, including any configuration of hardware, software, firmware, or combination thereof. For example, FIG. 7 shows a block diagram of a receiver 700 that includes a receiver translational circuit 702 as an example embodiment of receiver translational circuit 502 shown in FIG. 5. As shown in FIG. 7, receiver translational circuit 702 includes a down-converter 704, a high pass filter 706, and an up-converter 708. FIG. 8 shows a flowchart 800 providing example steps for operation of receiver 700, according to an embodiment of the present invention. Flowchart 800 is similar to flowchart 600 of FIG. 6, providing example steps for performing step 604 of flowchart 600. The steps for performing step 604 shown in FIG. 8 are described as follows.

As shown in flowchart 800, step 604 may include steps 802, 804, and 806. In step 802, the first RF communication signal is down-converted to a down-converted signal. For example, as shown in FIG. 7, down-converter 704 receives RF signal 312, which includes RF communication signal 102 and blocker signal 104. Down-converter 704 down-converts RF signal 312 to a frequency down-converted signal 710. RF communication signal 102 and blocker signal 104 are down-converted during the down-conversion of RF signal 312 by down-converter 704. For example, RF communication signal 102 may be down-converted to an intermediate frequency or to baseband by down-converter 704.

Down-converter 704 may be configured in any manner to perform frequency down-conversion. For example, in an embodiment, down-converter 704 includes one or more mixers, such as the mixer shown in FIG. 7. Alternatively, down-converter 704 may include other down-conversion mechanisms, such as a sample-and-hold device or other down-converter type. When down-converter 704 includes a mixer, as shown in FIG. 7, the mixer may receive an oscillating signal 716 from a local oscillator 714 of receiver 700. For example, local oscillator 714 may include a crystal oscillator, a phase lock loop circuit, a digital clock signal generator, and/or any other type of oscillating signal generator. The mixer mixes RF signal 312 with oscillating signal 716. Oscillating signal 716 has a frequency configured to down-convert RF signal 312 to an intermediate frequency or to baseband. For example, oscillating signal 716 may have a frequency equal to the carrier frequency of RF communication signal 102 (e.g., frequency $f_1$) to down-convert RF communication signal 102 to baseband.

Figure 9:
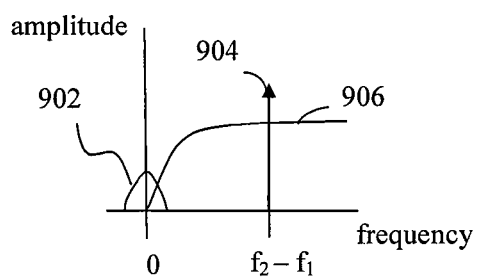
FIG. 9 shows an example frequency response of the high pass filter shown in FIG. 8, according to an embodiment of the present invention.

In step 804, the down-converted signal is high pass filtered. For example, as shown in FIG. 7, high pass filter 706 receives down-converted signal 710. High pass filter 706 is configured to pass high frequencies and to attenuate frequencies lower than a selected cutoff frequency. High pass filter 706 performs a high pass filtering operation on down-converted signal 710 to generate a high pass filtered down-converted signal 712. For example, FIG. 9 shows a frequency response 906 of high pass filter 706, according to an embodiment of the present invention. In the example of FIG. 9, down-converted signal 710 is a baseband signal, such that RF communication signal 102 was down-converted to baseband signal 902 and blocker signal 104 was down-converted to down-converted blocker signal 904 by down-converter 704. In the example of FIG. 9, a center frequency of baseband signal 902 is 0 Hz due to oscillating signal 716 having a frequency $f_1$. As shown in FIG. 9, frequency response 906 of high pass filter 706 is configured to attenuate baseband signal 902, while passing down-converted blocker signal 904 in high pass filtered down-converted signal 712.

High pass filter 706 may be configured in any manner to perform signal filtering. High pass filter 706 may be configured according to any filter type, passive or active, analog or digital, that may be implemented in an integrated circuit chip, including a Butterworth filter, a Chebyshev filter, or other filter configuration. Furthermore, a cutoff frequency for high pass filter 706 may be selected according to the particular application for receiver 700. For example, if blocker signal 104 is spaced by 80 MHz from communication signal 102, down-converted blocker signal 904 is spaced by 80 MHz ($f_2-f_1$) from baseband signal 902. In such a situation, the cutoff frequency for high pass filter 706 may be selected to be between 0 Hz and 80 MHz.

In step 806, the high pass filtered down-converted signal is up-converted to a second RF communication signal. For example, as shown in FIG. 7, up-converter 708 receives high pass filtered down-converted signal 712. Up-converter 708 up-converts high pass filtered down-converted signal 712 to filtered RF communication signal 504, which includes blocker signal 104 (up-converted from down-converted blocker signal 904 shown in FIG. 9).

Up-converter 708 may be configured in any manner to perform frequency up-conversion. For example, in an embodiment, up-converter 708 includes one or more mixers, such as the mixer shown in FIG. 7. Alternatively, up-converter 704 may include other up-conversion mechanisms, such as a sample-and-hold device or other up-converter type. When up-converter 708 includes a mixer, as shown in FIG. 7, the mixer may receive oscillating signal 716 from local oscillator 714 of receiver 700. The mixer mixes high pass filtered down-converted signal 712 with oscillating signal 716. Oscillating signal 716 has a frequency configured to up-convert high pass filtered down-converted signal 712 back to the original radio frequency.

Figure 10:
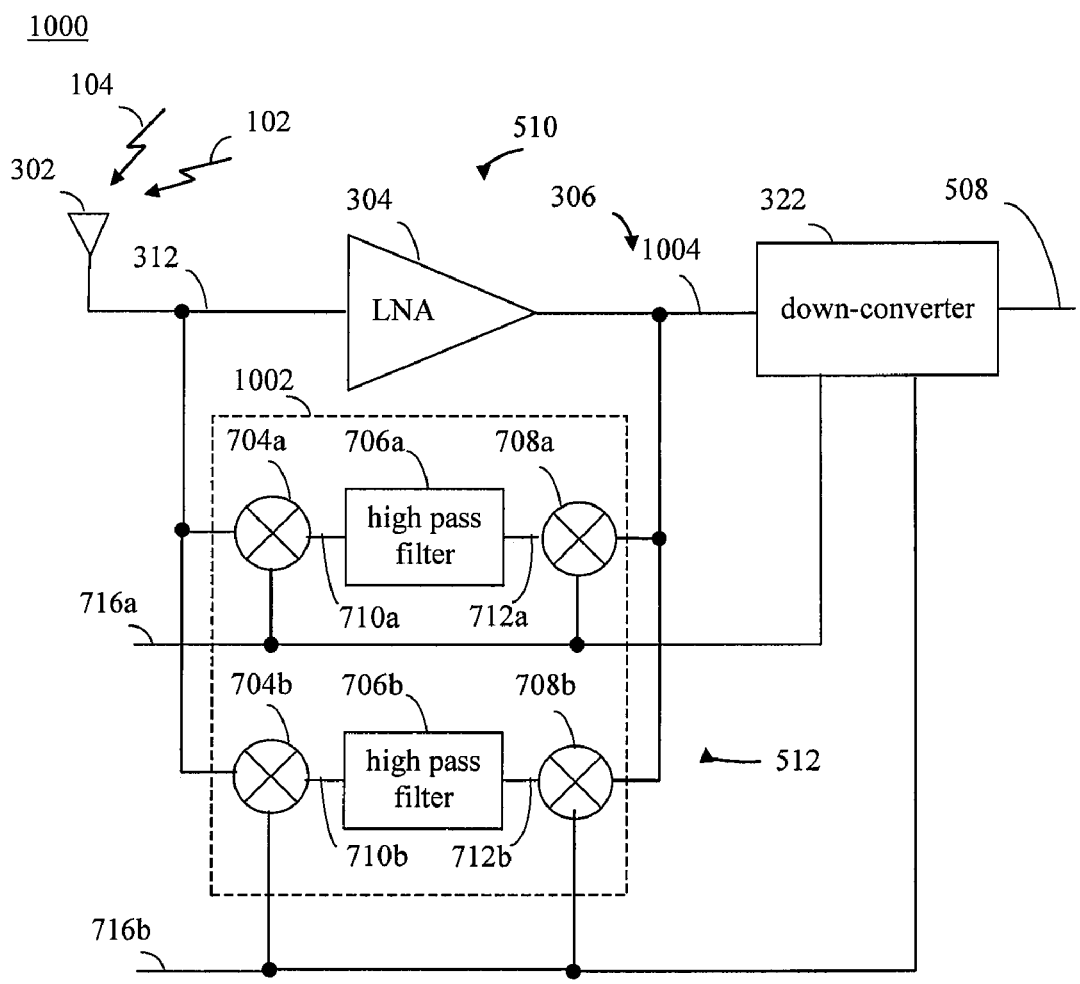
FIG. 10 shows a receiver that includes an example receiver translational circuit, according to an embodiment of the present invention.

In embodiments, RF communication signal 102 may be an I/Q modulated RF signal. Thus, in an embodiment, receiver translational circuit 502 of FIG. 5 may be configured to filter an I/Q modulated RF signal. For example, FIG. 10 shows a receiver 1000 that includes a receiver translational circuit 1002 as an example embodiment of receiver translational circuit 502 shown in FIG. 5. Receiver translational circuit 1002 is configured to filter an I/Q modulated signal. As shown in FIG. 10, receiver translational circuit 1002 includes an I-phase down-converter 704a, a Q-phase down-converter 704b, a first high pass filter 706a, a second high pass filter 706b, an I-phase up-converter 708a, and a Q-phase up-converter 708b. FIG. 11 shows a flowchart for performing step 604 of flowchart 800 in an I/Q modulation embodiment.

As shown in FIG. 11, step 604 includes steps 802, 804, and 806 of flowchart 800. In FIG. 11, step 802 includes steps 1102 and 1104, step 804 includes steps 1106 and 1108, and step 806 includes step 1110, 1112, and 1114. These steps are described as follows.

In step 1102, the first RF communication signal is down-converted to an I-phase down-converted signal. For example, as shown in FIG. 10, down-converter 704a receives RF signal 312, which includes RF communication signal 102 and blocker signal 104. In the current example, RF communication signal 102 is an I/Q modulated signal. Down-converter 704a down-converts RF signal 312 according to an I-phase oscillating signal 716a, to generate an I-phase down-converted signal 710a. I-phase down-converted signal 710a includes a down-converted I-phase signal component of RF communication signal 102 and a down-converted version of blocker signal 104.

In step 1104, the first RF communication signal is down-converted to a Q-phase down-converted signal. For example, as shown in FIG. 10, down-converter 704b receives RF signal 312, and down-converts RF signal 312 according to a Q-phase oscillating signal 716b, to generate a Q-phase down-converted signal 710b. Q-phase down-converted signal 710b includes a down-converted Q-phase signal component of RF communication signal 102 and a down-converted version of blocker signal 104.

In step 1106, the I-phase down-converted signal is high pass filtered. For example, as shown in FIG. 10, first high pass filter 706a high pass filters I-phase down-converted signal 710a to generate a high pass filtered I-phase down-converted signal 712a. First high pass filter 706a filters out the I-phase signal component of RF communication signal 102, while passing the down-converted version of blocker signal 104 (similarly to high pass filter 706 described above).

In step 1108, the Q-phase down-converted signal is high pass filtered. For example, as shown in FIG. 10, second high pass filter 706b high pass filters Q-phase down-converted signal 710b to generate a high pass filtered Q-phase down-converted signal 712b. Second high pass filter 706b filters out the Q-phase component of RF communication signal 102, while passing the down-converted version of blocker signal 104.

In step 1110, the high pass filtered I-phase down-converted signal is up-converted to an I-phase RF communication signal. For example, as shown in FIG. 10, up-converter 708a receives and up-converts high pass filtered I-phase down-converted signal 712a according to I-phase oscillating signal 716a, to generate an I-phase RF communication signal that is output onto node 1004. The generated I-phase RF communication signal includes blocker signal 104.

In step 1112, the high pass filtered Q-phase down-converted signal is up-converted to a Q-phase RF communication signal. For example, as shown in FIG. 10, up-converter 708b receives and up-converts high pass filtered Q-phase down-converted signal 712b according to Q-phase oscillating signal 716b, to generate a Q-phase RF communication signal that is output onto node 1004. The generated Q-phase RF communication signal includes blocker signal 104.

In step 1114, the I-phase RF communication signal and the Q-phase RF communication signal are combined to generate the second RF communication signal. At node 1004, the I-phase and Q-phase RF communication signals generated by up-converters 708a and 708b are combined. Furthermore, node 1004 operates as subtractor 306 shown in FIG. 5, to subtract the combined I-phase and Q-phase RF communication signals from amplified RF signal 314 generated by LNA 304. Thus, node 1004 generates output communication signal 506 (not indicated in FIG. 10). Communication signal 102 is present at node 1004, while blocker signal 104 is canceled out, by subtracting the combined blocker signal 104 output by up-converters 708a and 708b from blocker signal 104 output by LNA 304.

In some situations, a difference between a signal delay through first signal path 510 and a signal delay through second signal path 512 can cause insufficient cancelation of blocker signal 104 by subtractor 306. For example, referring to FIG. 7, the phase delay due to the one or more components in first signal path 510, including LNA 304, may be different from the phase delay due to the one or more components in second signal path 512, including down-converter 704, high-pass filter 706, and up-converter 708. This difference may be due to a difference in a number of components between paths 510 and 512, and/or due to the particular delay values of each of the components in paths 510 and 512. For example, as shown in FIG. 7, second signal path 512 may have more components than are positioned in first signal path 510. Delays due to particular components may be frequency dependent, leading to further delay/phase mismatch between paths 510 and 512.

In an embodiment, to improve cancellation of blocker signal 104, one or more phase adjusters may be positioned in second signal path 512, to adjust an amount of signal delay through second signal path 512 to match the amount of signal delay through first signal path 510. For instance, in an embodiment, flowchart 600 may include an additional step 1202 shown in FIG. 12. Step 1202 may be performed during step 604 of flowchart 600 of FIG. 6, or elsewhere in flowchart 600. In step 1202, a signal phase is adjusted in the second signal path such that the second RF communication signal is phase adjusted. Referring to FIG. 5, phase adjuster(s) that perform step 1202 may be positioned in receiver translational circuit 502 located in second signal path 512. Referring to FIG. 7, a phase adjuster(s) may be positioned in signal path 512 prior to up-converter 704, between up-converter 704 and high pass filter 706, between high pass filter 706 and up-converter 708, and/or after up-converter 708. The signal phase in second signal path 512 is adjusted by the phase adjustor according to step 1202 to match a signal phase in first signal path 510.

Figures 12, 13:
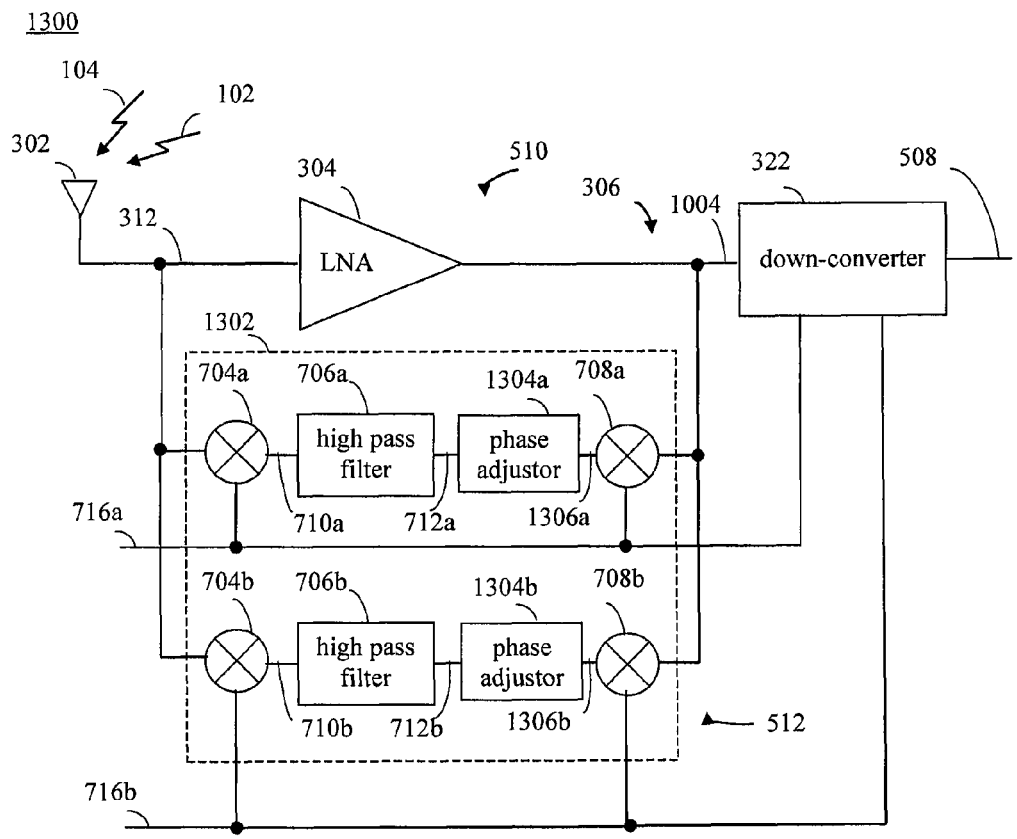
FIG. 12 shows a step for adjusting a signal phase, according to an example embodiment of the present invention.
FIG. 13 shows a receiver that includes an example receiver translational circuit, according to an embodiment of the present invention.

FIG. 13 shows a receiver 1300 that includes a receiver translational circuit 1302 as an example embodiment of receiver translational circuit 502 shown in FIG. 5. Receiver translational circuit 1302 is configured to filter an I/Q modulated signal similarly to receiver translational circuit 1002 shown in FIG. 10, and further includes a first phase adjustor 1304a in an I-phase signal filtering path and a Q-phase phase adjustor 1304b in a Q-phase signal filtering path. In the example of FIG. 13, first and second phase delays 1304a and 1304b are shown for illustrative purposes as respectively following up-converters 708a and 708b. However, first and second phase delays 1304a and 1304b may alternatively be located elsewhere in the respective I-phase and Q-phase signal filtering paths of second signal path 512.

Figure 14:
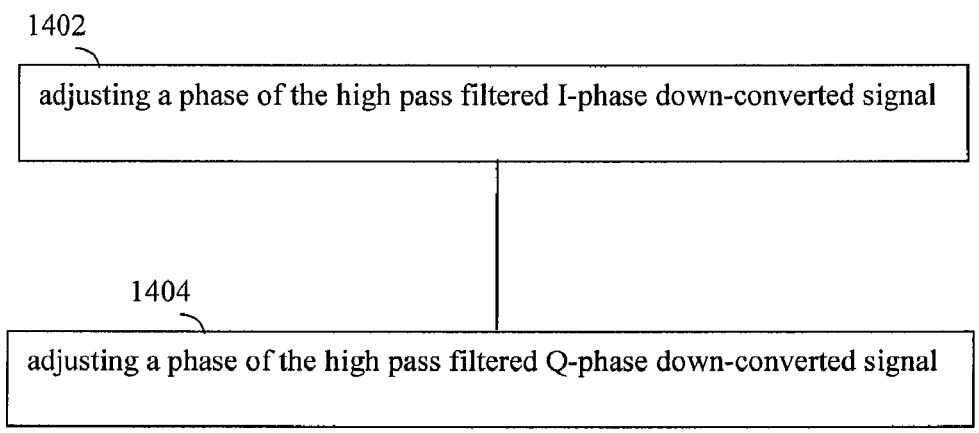
FIG. 14 shows steps for adjusting signal phase in an I/Q modulation scheme, according to an example embodiment of the present invention.

FIG. 14 shows example additional steps 1402 and 1404 for performing phase adjustment in an I/Q modulation receiver, according to an embodiment of the present invention. For example, steps 1402 and 1402 may be performed in flowchart 1100 shown in FIG. 11. Steps 1402 and 1404 are described as follows.

In step 1402, a phase of the high pass filtered I-phase down-converted signal is adjusted. For example, as shown in FIG. 13, phase adjustor 1304a may perform step 1402. Phase adjustor 1304a receives high pass filtered I-phase down-converted signal 712a. Phase adjustor 1304a is configured to adjust a phase of high pass filtered I-phase down-converted signal 712a, to match a phase delay present in first signal path 510. Phase adjustor 1304a generates phase adjusted high pass filtered I-phase down-converted signal 1306a, which is received and up-converted by up-converter 708a.

In step 1404, a phase of the high pass filtered Q-phase down-converted signal is adjusted. For example, as shown in FIG. 13, phase adjustor 1304b may perform step 1404. Phase adjustor 1304b receives high pass filtered Q-phase down-converted signal 712b. Phase adjustor 1304b is configured to adjust a phase of high pass filtered Q-phase down-converted signal 712b, to match a phase delay present in first signal path 510. Phase adjustor 1304b generates phase adjusted high pass filtered Q-phase down-converted signal 1306b, which is received and up-converted by up-converter 708b.

Phase adjustors 1304 may be implemented in any manner to delay respective signals. For example, phase adjustors 1304 may include phase delay circuits, including programmable phase delay circuits, scaling/gain modules, and/or other elements configured to adjust a phase delay.

Figure 15:
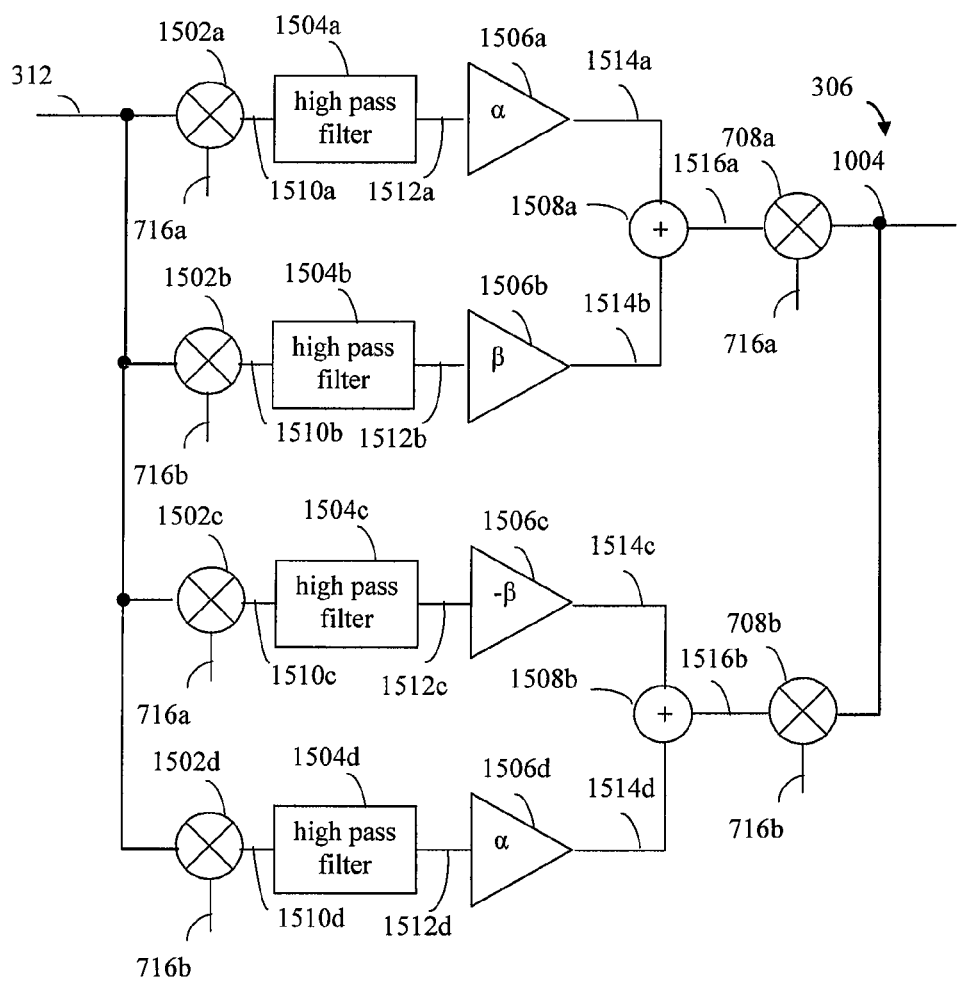
FIG. 15 shows an example receiver translational circuit, according to an embodiment of the present invention.

FIG. 15 shows a receiver translational circuit 1500 as an example embodiment of receiver translational circuit 502 shown in FIG. 5. Receiver translational circuit 1500 is configured to filter an I/Q modulated signal similarly to receiver translational circuit 1002 shown in FIG. 10, and is further configured to adjust a phase delay for second signal path 512. As shown in FIG. 15, receiver translational circuit 1500 includes first-fourth down-converters 1502a-1502d, first-fourth high pass filters 1504a-1504d, first-fourth scalers 1506a-1506d, first and second combiners 1508a and 1508b, and up-converters 708a and 708b. First and second down-converters 1502a and 1502b, first and second high pass filters 1504a and 1504b, first and second scalers 1506a and 1506b, first combiner 1508a, and up-converter 708a are configured as an I-phase signal processing channel. Third and fourth down-converters 1502c and 1502d, third and fourth high pass filters 1504c and 1504d, third and fourth scalers 1506c and 1506d, second combiner 1508b, and up-converter 708b are configured as a Q-phase signal processing channel.

Figure 16A:
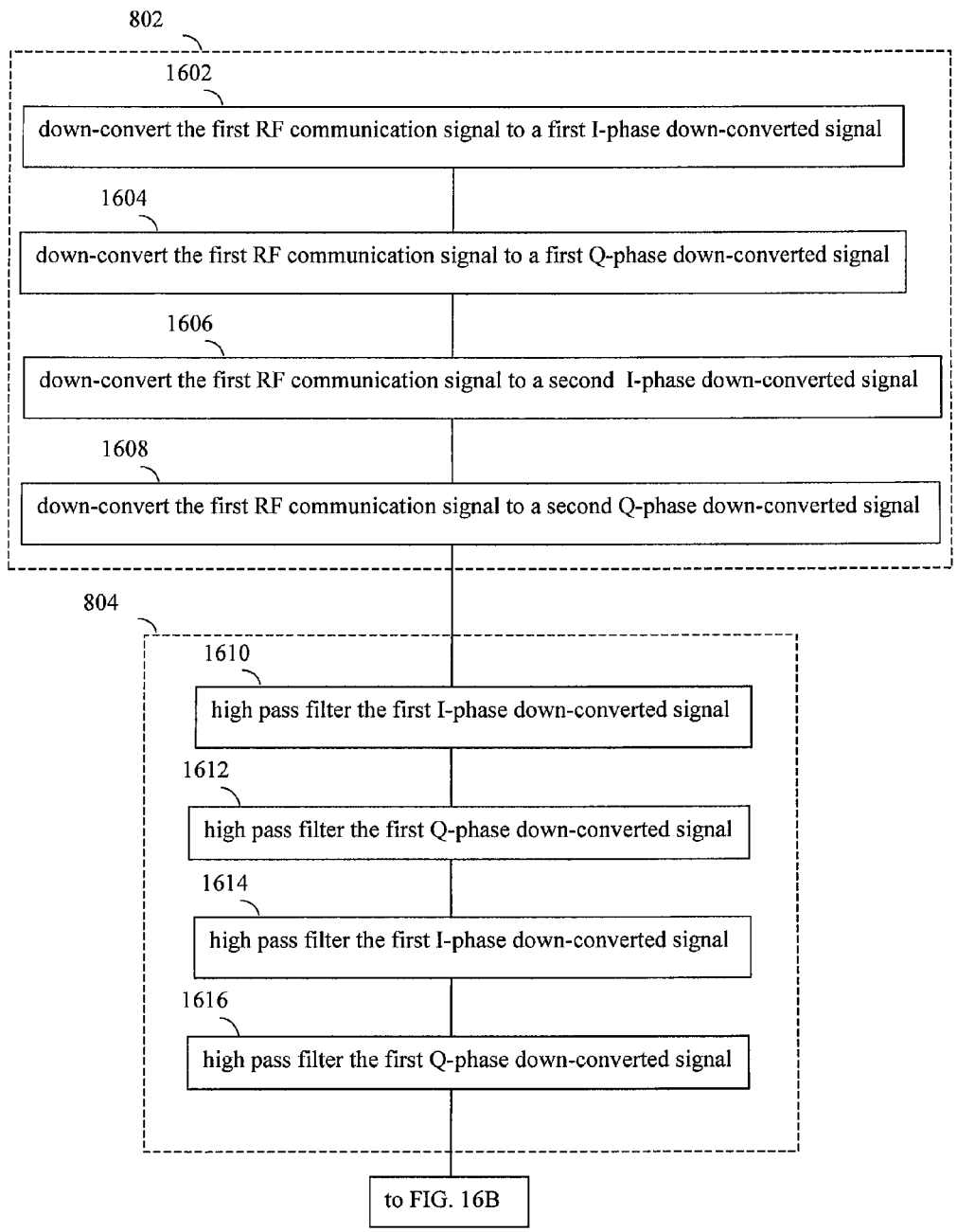
FIGS. 16A and 16B show a flowchart providing example steps for operation of the receiver translational circuit of FIG. 15, according to an example embodiment of the present invention.
Figure 16B:
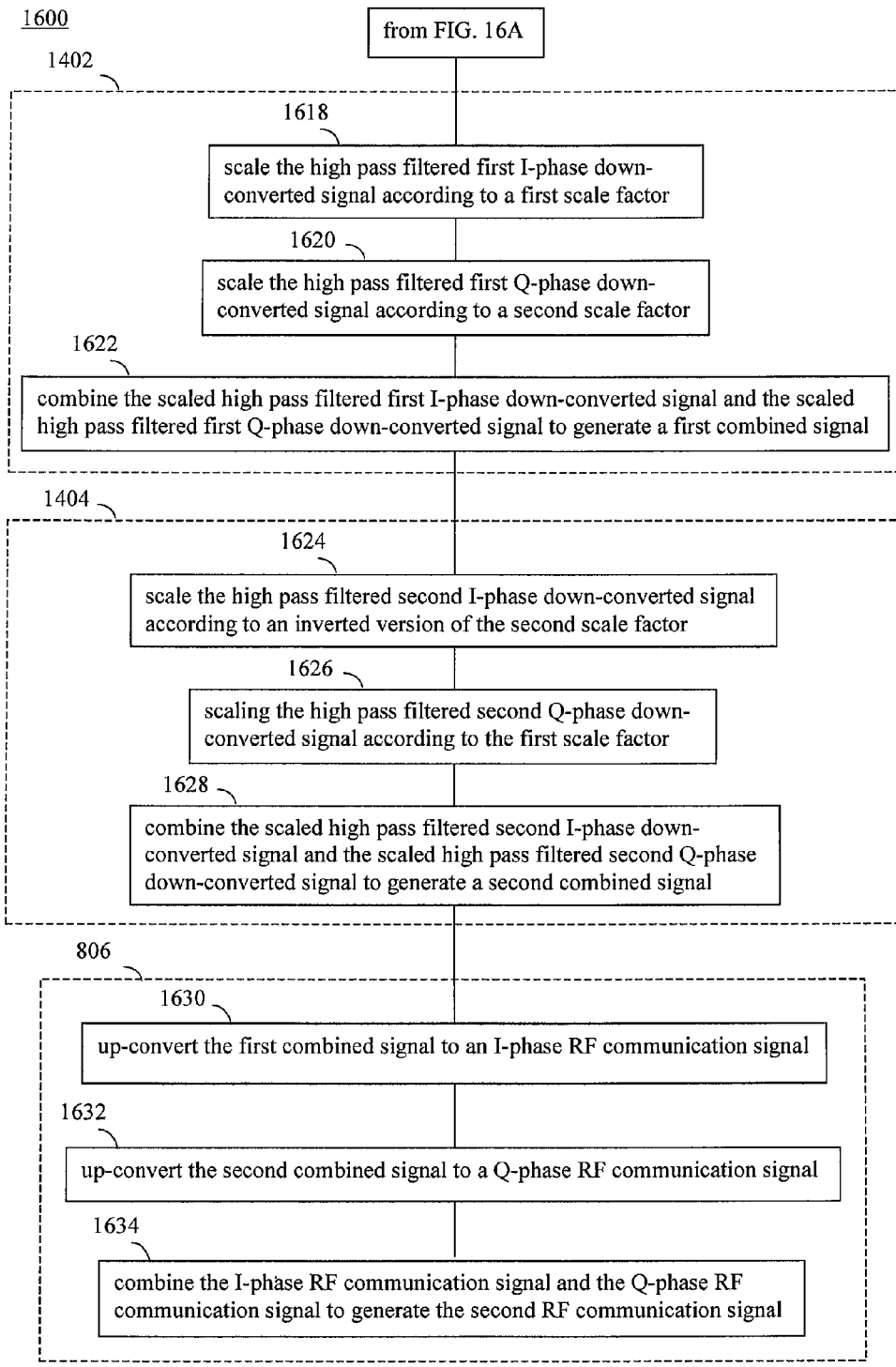

FIGS. 16A and 16B show a flowchart 1600 for performing step 604 (steps 802, 804, and 806 in FIG. 8) of flowchart 800 and steps 1402 and 1404 shown in FIG. 14 using receiver translational circuit 1500, according to an example embodiment of the present invention. The steps of flowchart 1600 do not need to occur in the order shown. Flowchart 1600 is described as follows.

As shown in FIG. 16A, in flowchart 1600, step 802 includes steps 1602, 1604, 1606, and 1608. In step 1602, the first RF communication signal is down-converted to a first I-phase down-converted signal. As shown in FIG. 15, and similar to the description above with regard to FIGS. 10 and 11, down-converter 1502a receives RF signal 312, which includes RF communication signal 102 and blocker signal 104. In the current example, RF communication signal 102 is an I/Q modulated signal. Down-converter 1502a down-converts RF signal 312 according to I-phase oscillating signal 716a, to generate a first I-phase down-converted signal 1510a. First I-phase down-converted signal 1510a includes a down-converted I-phase signal component of RF communication signal 102 and a down-converted version of blocker signal 104.

In step 1604, the first RF communication signal is down-converted to a first Q-phase down-converted signal. In a similar fashion as described above, down-converter 1502b down-converts RF signal 312 according to Q-phase oscillating signal 716b, to generate a first Q-phase down-converted signal 1510b.

In step 1606, the first RF communication signal is down-converted to a second I-phase down-converted signal. In a similar fashion as described above, down-converter 1502c down-converts RF signal 312 according to I-phase oscillating signal 716a, to generate a second I-phase down-converted signal 1510c.

In step 1608, the first RF communication signal is down-converted to a second Q-phase down-converted signal. In a similar fashion as described above, down-converter 1502d down-converts RF signal 312 according to Q-phase oscillating signal 716b, to generate a second Q-phase down-converted signal 1510d.

As shown in FIG. 16A, in flowchart 1600, step 804 includes steps 1610, 1612, 1614, and 1616. In step 1610, the first I-phase down-converted signal is high pass filtered. As shown in FIG. 15, and similar to the description above with regard to FIGS. 10 and 11, high pass filter 1504a high pass filters first I-phase down-converted signal 1510a to generate a high pass filtered first I-phase down-converted signal 1512a. High pass filter 1504a filters out the I-phase signal component of RF communication signal 102 present in signal 1512a, while passing the down-converted version of blocker signal 104 in signal 1512a.

In step 1612, the first Q-phase down-converted signal is high pass filtered. In a similar fashion as described above, high pass filter 1504b high pass filters first Q-phase down-converted signal 1510b to generate a high pass filtered first Q-phase down-converted signal 1512b. High pass filter

1504*b* filters out the Q-phase signal component of RF communication signal 102 present in signal 1512*b*, while passing the down-converted version of blocker signal 104 in signal 1512*b*.

In step 1614, the second I-phase down-converted signal is high pass filtered. In a similar fashion as described above, high pass filter 1504*c* high pass filters second I-phase down-converted signal 1510*c* to generate a high pass filtered second I-phase down-converted signal 1512*c*. High pass filter 1504*c* filters out the I-phase signal component of RF communication signal 102 present in signal 1512*c*, while passing the down-converted version of blocker signal 104 in signal 1512*c*.

In step 1616, the second Q-phase down-converted signal is high pass filtered. In a similar fashion as described above, high pass filter 1504*d* high pass filters second Q-phase down-converted signal 1510*d* to generate a high pass filtered second Q-phase down-converted signal 1512*d*. High pass filter 1504*d* filters out the Q-phase signal component of RF communication signal 102 present in signal 1512*d*, while passing the down-converted version of blocker signal 104 in signal 1512*d*.

As shown in FIG. 16B, in flowchart 1600, step 1402 includes steps 1618, 1620, and 1622. In step 1618, the high pass filtered first I-phase down-converted signal is scaled according to a first scale factor. For example, as shown in FIG. 15, scaler 1506*a* receives high pass filtered first I-phase down-converted signal 1512*a*. Scaler 1506*a* scales (e.g., multiplies) signal 1512*a* according to a scale factor α. Scaler 1506*a* generates a scaled high pass filtered first I-phase down-converted signal 1514*a*, which is the scaled version of signal 1512*a*.

In step 1620, the high pass filtered first Q-phase down-converted signal is scaled according to a second scale factor. For example, as shown in FIG. 15, scaler 1506*b* receives high pass filtered first Q-phase down-converted signal 1512*b*. Scaler 1506*b* scales signal 1512*b* according to a scale factor β. Scaler 1506*b* generates a scaled high pass filtered first Q-phase down-converted signal 1514*b*, which is the scaled version of signal 1512*b*.

In step 1622, the scaled high pass filtered first I-phase down-converted signal and the scaled high pass filtered first Q-phase down-converted signal are combined to generate a first combined signal. For example, as shown in FIG. 15, a combiner 1508*a* receives scaled high pass filtered first I-phase and first Q-phase down-converted signals 1514*a* and 1514*b*. Combiner 1508*a* combines (e.g., sums) signals 1514*a* and 1514*b* to generate I-phase combined signal 1516*a*.

As shown in FIG. 16B, in flowchart 1600, step 1404 includes steps 1624, 1626, and 1628. In step 1624, the high pass filtered second I-phase down-converted signal is scaled according to an inverted version of the second scale factor. For example, as shown in FIG. 15, scaler 1506*c* receives high pass filtered second I-phase down-converted signal 1512*c*. Scaler 1506*c* scales signal 1512*c* according to the scale factor −β. Scaler 1506*c* generates a scaled high pass filtered second I-phase down-converted signal 1514*c*, which is the scaled version of signal 1512*c*.

In step 1626, the high pass filtered second Q-phase down-converted signal is scaled according to the first scale factor. For example, as shown in FIG. 15, scaler 1506*d* receives high pass filtered second Q-phase down-converted signal 1512*d*. Scaler 1506*d* scales signal 1512*d* according to scale factor β. Scaler 1506*d* generates a scaled high pass filtered second Q-phase down-converted signal 1514*d*, which is the scaled version of signal 1512*d*.

In step 1628, the scaled high pass filtered second I-phase down-converted signal and the scaled high pass filtered second Q-phase down-converted signal are combined to generate a second combined signal. For example, as shown in FIG. 15, a combiner 1508*b* receives scaled high pass filtered second I-phase and second Q-phase down-converted signals 1514*c* and 1514*d*. Combiner 1508*b* combines signals 1514*c* and 1514*d* to generate Q-phase combined signal 1516*b*.

Scalers 1506*a*-1506*d* may be configured to perform scaling in any manner, as would be known to persons skilled in the relevant art(s). For example, scalers 1506*a*-1506*d* may be gain stages, which may each include one or more amplifiers and/or other gain elements, configured to apply gain to their input signals according to the corresponding scale factor. Combiners 1508*a* and 1508*b* may be circuit nodes or other circuit configuration that adds received signals. Example circuits for combiners 1508*a* and 1508*b* include configurations of resistors and/or other circuit elements, amplifiers configured in summing configurations, or other circuits, as would be known to persons skilled in the relevant art(s).

As shown in FIG. 16B, in the embodiment of flowchart 1600, step 806 of FIG. 8 includes steps 1630, 1632, and 1634. In step 1630, the first combined signal is up-converted to an I-phase RF communication signal. As shown in FIG. 15, and similar to the description above with regard to FIGS. 10 and 11, up-converter 708*a* receives and up-converts I-phase combined signal 1516*a* according to I-phase oscillating signal 716*a*, to generate an I-phase RF communication signal that is output onto node 1004. The generated I-phase RF communication signal includes blocker signal 104.

In step 1632, the second combined signal is up-converted to a Q-phase RF communication signal. Similar to the description above, up-converter 708*b* receives and up-converts Q-phase combined signal 1516*b* according to Q-phase oscillating signal 716*b*, to generate a Q-phase RF communication signal that is output onto node 1004. The generated Q-phase RF communication signal includes blocker signal 104.

In step 1634, the I-phase RF communication signal and the Q-phase RF communication signal are combined to generate the second RF communication signal. At node 1004, the I-phase and Q-phase RF communication signals generated by up-converters 708*a* and 708*b* are combined. Furthermore, as described above, node 1004 operates as subtractor 306 shown in FIG. 5, to subtract the combined I-phase and Q-phase RF communication signals from amplified RF signal 314 generated by LNA 304.

The implementation of FIG. 15 adjusts a phase delay of second signal path 512. Values for scale factors α and β may be selected to adjust the phase of signals transmitted through signal path 512 by a desired amount. For example, the I-phase signals being processed (e.g., signals 1510*a*, 1510*c*) may be represented as $\sin(\omega_0 t)$, and the Q-phase signals being processed (e.g., signals 1510*b* and 1510*d*) may be represented as $\cos(\omega_0 t)$. A desired amount of phase adjustment to match phase delays between first and second signal paths 510 and 512 may be represented as φ. Values for scale factors α and β may be selected as follows:

$$\alpha = \cos\phi, \text{ and} \qquad \text{Equation 1}$$

$$\beta = \sin\phi. \qquad \text{Equation 2}$$

Scaled high pass filtered first I-phase and first Q-phase down-converted signals 1514*a* and 1514*b*, as generated by scalers 1506*a* and 1506*b* may be represented as follows:

$$\text{Signal } 1514a = \alpha \sin(\omega_0 t) = \cos\phi \sin(\omega_0 t), \text{ and} \qquad \text{Equation 3}$$

Signal $1514b=\beta \cos(\omega_0 t)=\sin \phi \cos(\omega_0 t)$.  Equation 4

I-phase combined signal 1516a, which is the sum of signals 1514a and 1514b, may be represented as follows:

Signal $1516a=\cos \phi \sin(\omega_0 t)+\sin \phi \cos(\omega_0 t)=\sin(\omega_0 t+\phi)$.  Equation 5

Thus, as indicated by Equation 5, signal 1516a ($\sin(\omega_0 t+\phi)$) represents a phase shift by an amount $\phi$ for the I-phase portion of circuit 1500, where the value of $\phi$ is selected by the values of scale factors $\alpha$ and $\beta$ according to Equations 1 and 2. In a likewise manner, $\alpha$ and $\beta$ provide a selectable phase shift of $\phi$ for the Q-phase portion of circuit 1500, as follows:

Signal $1514c=-\beta \sin(\omega_0 t)=-\sin \phi \sin(\omega_0 t)$, and  Equation 6

Signal $1514d=\alpha \cos(\omega_0 t)=\cos \phi \cos(\omega_0 t)$.  Equation 7

Signal $1516b=\cos \phi \cos(\omega_0 t)-\sin \phi \sin(\omega_0 t)=\cos(\omega_0 t+\phi)$.  Equation 8

Thus, in the embodiment of FIG. 15, scalers 1506a-1506d are configured to shift a phase of signals through second signal path 512 by an amount $\phi$ determined by scale factors $\alpha$ and $\beta$.

An amount of phase shift provided by phase adjustors (e.g., phase adjustors 1304a and 1304b in FIG. 13, scalers 1506a-1506d in FIG. 15) may be determined in any manner. For example, in an embodiment, a phase adjustor may provide a predetermined amount of phase adjustment. The predetermined amount of phase adjustment may be based upon an amount of phase delay estimated to be provided by components in first and second signal paths 510 and 512. The predetermined amount of phase adjustment may be a difference between the estimated phase delays for first and second signal paths 510 and 512. In another embodiment, a phase adjustor may provide an amount of phase adjustment determined for a particular situation, factoring in received signal frequency, a power of blocker signal 104 remaining in output communication signal 506, and/or further factors. For example, hardware, software, and/or firmware logic (e.g., a processor) may be present to determine a phase adjustment based on estimated phase delays for first and second signal paths 510 and 512, received signal frequency, a power of blocker signal 104 remaining in output communication signal 506, and/or further factors.

Figure 17:
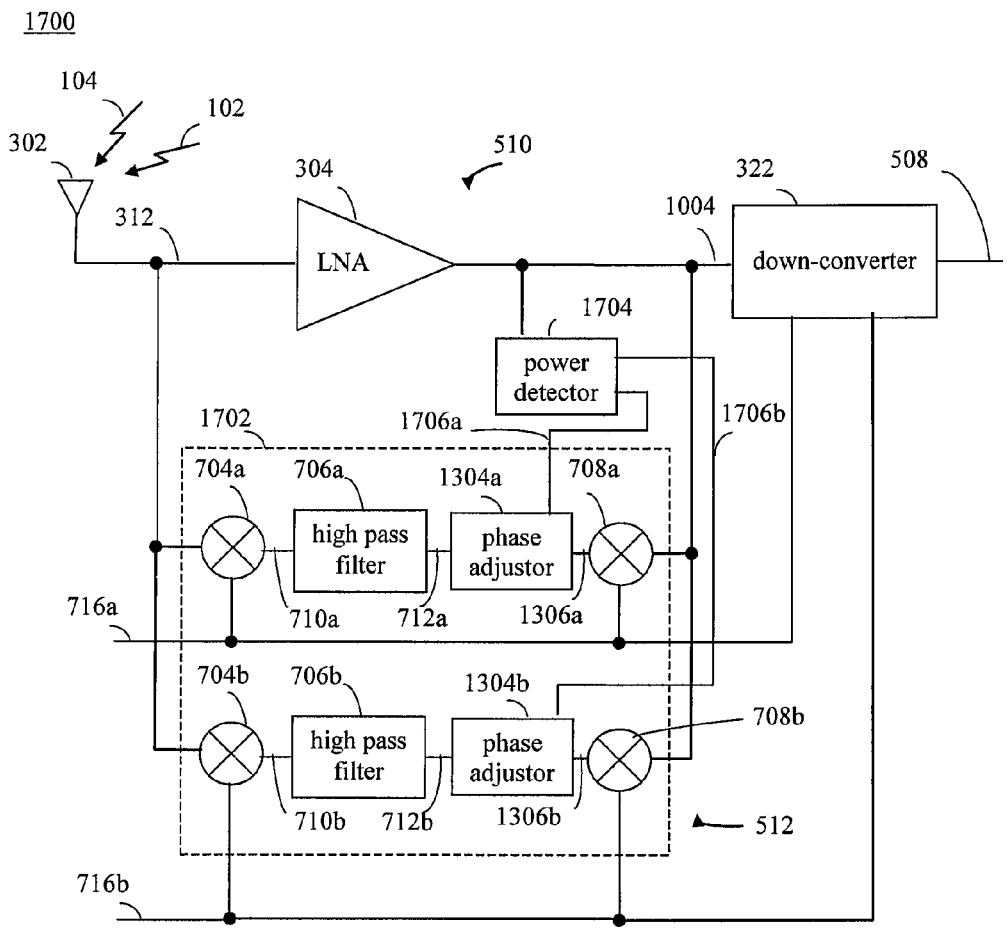
FIG. 17 shows a receiver that includes a power detector, according to an example embodiment of the present invention.

FIG. 17 shows an example receiver 1700 that includes a power detector 1704, according to an example embodiment of the present invention. Power detector 1704 is configured to determine a power of one or more undesired frequencies of blocker signal 104 at node 1004, in a manner known to persons skilled in the relevant art(s). Based on the detected power, power detector 1704 generates first and second phase adjustment signals 1706a and 1706b. First and second phase adjustment signals 1706a and 1706b provide an indication to phase adjustors 1304a and 1304b of an amount of phase adjustment to perform in their respective I and Q signal paths (note that in an embodiment, phase adjustment signals 1706a and 1706b may be the same signal).

For example, if power detector 1704 determines a power level of an undesired frequency to be unacceptably high, power detector 1704 may generate an indication to phase adjustors 1304a and 1304b to adjust phase incrementally higher and/or lower, until at a particular phase delay value, the power level decreases to an acceptable level and/or reaches a minimum level.

Power detector 1704 may be coupled to phase adjustors in any of the embodiments described herein, including in receivers 500, 700, 1000, and 1300, to provide control of phase adjustment. Furthermore, power detector 1704 may be coupled to scalers 1506a-1506d in FIG. 15 to adjust a value of the respective scale factors to adjust signal phase.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for filtering a radio frequency (RF) signal, comprising:
   amplifying a first RF communication signal in a first signal path;
   filtering the first RF communication signal in a second signal path, said filtering the first RF communication signal in the second signal path including
      down-converting the first RF communication signal to a down-converted signal,
      high pass filtering the down-converted signal, and
      up-converting the high pass filtered down-converted signal to a second RF communication signal;
   adjusting a signal phase in the second signal path; and
   subtracting the second RF communication signal from the amplified first RF communication signal to generate a third RF communication signal;
   wherein said down-converting the first RF communication signal to a down-converted signal comprises
      down-converting the first RF communication signal to a first I-phase down-converted signal,
      down-converting the first RF communication signal to a first Q-phase down-converted signal,
      down-converting the first RF communication signal to a second I-phase down-converted signal, and
      down-converting the first RF communication signal to a second Q-phase down-converted signal;
   wherein said high pass filtering the down-converted signal comprises
      high pass filtering the first I-phase down-converted signal,
      high pass filtering the first Q-phase down-converted signal,
      high pass filtering the second I-phase down-converted signal, and
      high pass filtering the second Q-phase down-converted signal;
   wherein said adjusting a signal phase in the second signal path comprises
      scaling the high pass filtered first I-phase down-converted signal according to a first scale factor,
      scaling the high pass filtered first Q-phase down-converted signal according to a second scale factor,
      combining the scaled high pass filtered first I-phase down-converted signal and the scaled high pass filtered first Q-phase down-converted signal to generate a first combined signal,
      scaling the high pass filtered second I-phase down-converted signal according to an inverted version of the second scale factor,
      scaling the high pass filtered second Q-phase down-converted signal according to the first scale factor, and combining the scaled high pass filtered second I-phase down-converted signal and the scaled high pass filtered second Q-phase down-converted signal to generate a second combined signal; and wherein said up-converting the high pass filtered down-converted signal to a second RF communication signal comprises
up-converting the first combined signal to an I-phase RF communication signal,
up-converting the second combined signal to a Q-phase RF communication signal, and
combining the I-phase RF communication signal and the Q-phase RF communication signal to generate the second RF communication signal.

2. The method of claim 1, wherein said high pass filtering the down-converted signal comprises:
filtering out a desired information signal received in the first RF communication signal from the down-converted signal.

3. The method of claim 2, wherein said adjusting a signal phase in the second signal path comprises:
adjusting the signal phase in the second signal path to match a phase of the amplified first RF communication signal.

4. The method of claim 3, wherein said subtracting the second RF communication signal from the amplified first RF communication signal to generate a third RF communication signal comprises:
canceling out an undesired signal received in the first RF communication signal;
wherein the generated third RF communication signal includes the desired information signal received in the first RF communication signal.

5. The method of claim 1, wherein said adjusting a signal phase in the second signal path comprises:
adjusting a phase of the high pass filtered down-converted signal.

6. The method of claim 1, wherein said adjusting a signal phase in the second signal path comprises:
adjusting a phase of the second RF communication signal.

7. The method of claim 1, further comprising:
determining a power level of an undesired frequency of the generated third RF communication signal;
wherein said adjusting a signal phase in the second signal path comprises:
adjusting the signal phase in the second signal path according to the determined power level.

8. The method of claim 1, wherein said adjusting a signal phase in the second signal path comprises:
adjusting the signal phase in the second signal path according to a predetermined delay of at least one component in the second signal path.

9. A system for filtering a radio frequency (RF) signal, comprising:
an amplifier in a first signal path, wherein the amplifier is configured to amplify a first RF communication signal;
a receiver translational circuit in a second signal path, wherein the receiver translational signal is configured to filter the first RF communication signal to a second RF communication signal; and
a subtractor configured to subtract the second RF communication signal from the amplified first RF communication signal to generate a third RF communication signal;
wherein the receiver translational circuit includes a phase adjustor configured to adjust a signal phase in the second signal path;
wherein the receiver translational circuit comprises a first down-converter configured to down-convert the first RF communication signal to a first I-phase down-converted signal,
a second down-converter configured to down-convert the first RF communication signal to a first Q-phase down-converted signal,
a third down-converter configured to down-convert the first RF communication signal to a second I-phase down-converted signal,
a fourth down-converter configured to down-convert the first RF communication signal to a second Q-phase down-converted signal,
a first high pass filter configured to high pass filter the first I-phase down-converted signal,
a second high pass filter configured to high pass filter the first Q-phase down-converted signal,
a third high pass filter configured to high pass filter the second I-phase down-converted signal,
a fourth high pass filter configured to high pass filter the second Q-phase down-converted signal,
a first scaler configured to scale the high pass filtered first I-phase down-converted signal according to a first scale factor,
a second scaler configured to scale the high pass filtered first Q-phase down-converted signal according to a second scale factor,
a first combiner configured to combine the scaled high pass filtered first I-phase down-converted signal and the scaled high pass filtered first Q-phase down-converted signal to generate a first combined signal,
a third scaler configured to scale the high pass filtered second I-phase down-converted signal according to an inverted version of the second scale factor,
a fourth scaler configured to scale the high pass filtered second Q-phase down-converted signal according to the first delay factor,
a second combiner configured to combine the scaled high pass filtered second I-phase down-converted signal and the scaled high pass filtered second Q-phase down-converted signal to generate a second combined signal,
a first up-converter configured to up-convert the first combined signal to an I-phase RF communication signal,
a second up-converter configured to up-convert the second combined signal to a Q-phase RF communication signal, and
a third combiner configured to combine the I-phase RF communication signal and the Q-phase RF communication signal to generate the second RF communication signal.

10. The system of claim 9, wherein the phase adjustor is configured to adjust the signal phase in the second signal path to match a phase of the amplified first RF communication signal.

11. The system of claim 10, wherein the subtractor is configured to subtract the second RF communication signal from the amplified first RF communication signal to cancel out an undesired signal received in the first RF communication signal;
wherein the generated third RF communication signal includes the desired information signal received in the first RF communication signal.

12. The system of claim 9, wherein the phase adjustor is configured to adjust a phase of the high pass filtered down-converted signal.

13. The system of claim 9, wherein the phase adjustor is configured to adjust a phase of the second RF communication signal.

14. The system of claim 9, further comprising:
a power detector configured to determine a power level of an undesired frequency of the generated third RF communication signal;
wherein the phase adjustor is configured to adjust the signal phase in the second signal path according to the determined power level.

15. The system of claim 9, wherein the phase adjustor is configured to adjust the signal phase in the second signal path according to a predetermined delay of at least one component in the second signal path.

16. The system of claim 9, wherein the phase adjustor comprises a programmable phase delay circuit.

* * * * *